(12) United States Patent
Matsui

(10) Patent No.: US 7,292,520 B2
(45) Date of Patent: Nov. 6, 2007

(54) DATA RECORDING AND REPRODUCING DEVICE

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 550 days.

(21) Appl. No.: 10/830,890

(22) Filed: Apr. 23, 2004

(65) Prior Publication Data
US 2004/0213101 A1 Oct. 28, 2004

(30) Foreign Application Priority Data
Apr. 23, 2003 (JP) ............................. P2003-118524

(51) Int. Cl.
*G11B 7/004* (2006.01)
(52) U.S. Cl. ...................................... 369/126
(58) Field of Classification Search ................. 369/126
See application file for complete search history.

(56) References Cited

U.S. PATENT DOCUMENTS

| 5,777,977 | A | * | 7/1998 | Fujiwara et al. | ............ | 369/126 |
| 6,005,246 | A | * | 12/1999 | Kitamura et al. | ........... | 250/306 |
| 6,097,197 | A | * | 8/2000 | Matsuyama et al. | ........ | 324/750 |
| 6,101,164 | A | * | 8/2000 | Kado et al. | ................. | 369/126 |
| 6,185,991 | B1 | * | 2/2001 | Hong et al. | .................... | 73/105 |

FOREIGN PATENT DOCUMENTS

| JP | 1998-334525 | 12/1998 |
| JP | 2001-184751 | 7/2001 |
| JP | 2002-530789 | 9/2002 |

OTHER PUBLICATIONS

Office Action dated Feb. 28, 2007 issued by the Japanese Patent Office in Japanese Patent Application No. 2003-118524, with English translation, 4 pages.

* cited by examiner

*Primary Examiner*—Andrea Wellington
*Assistant Examiner*—Michael V Battaglia
(74) *Attorney, Agent, or Firm*—Osha Liang LLP

(57) ABSTRACT

The data recording and reproducing device includes a cantilever 11 having a probe h and extending so as to locate the tip of the probe h in the vicinity of a recording film 20, a piezo driving unit 12 for vibrating the cantilever 11, an optical lever 13 for detecting a displacement due to the vibration of the cantilever 11, a Z feedback circuit 33 for performing feedback control for the driving in a direction vertical to the table 21, a write circuit 18 for supplying a recording voltage to the cantilever 11 in response to a recording signal IN, a voltage circuit 16 and a variable bias circuit 17 for applying an AC voltage to the cantilever 11, and a V feedback circuit 34 for performing the feedback control for the bias voltage applied to the cantilever.

5 Claims, 1 Drawing Sheet

DATA RECORDING AND REPRODUCING DEVICE

BACKGROUND OF THE INVENTION

1. Field of the Invention

The present invention relates to a data recording and reproducing device to which a scanning probe microscope is applied and a technology effectively used for a data recording and reproducing device having a phase-change type film as a recording medium.

2. Description of the Related Art

At present, a scanning probe microscope which performs observation with a probe being close to the surface of a sample allows the surface of a material to be observed in nano-order of magnitude. Further, by manipulating an individual atom using the scanning probe microscope to form a mark in nano-order of magnitude on the surface of a substance, it is possible to record data with a very high recording density.

On the other hand, at present, many phase-change type recording media such as a recording type DVD (digital versatile disk) and a recording disk for recording and reproducing using a blue or violet laser are used. For this reason, research and development of these recoding media is progressing greatly.

In view of this, the inventors of this invention have examined if or not data can be recorded/reproduced on the recording film using a scanning probe microscope. This is because they thought that since various kinds of researches and developments of the phase-change type recording film are being pursued, the phase-change type recording films with high accuracy and various properties can be relatively easily obtained.

Among the data recording and reproducing devices to which the scanning probe microscope is applied, an exemplary technique using the phase-change type recording film as a recording medium was an optical recording and reproducing device disclosed in JP-A-2001-184751. This optical recording and reproducing device performs data recording using the near-field light when laser light is discharged from a minute aperture having a size smaller than its wavelength. Namely, the data recording is carried out through phase-change by a minute spot in such a manner that the laser output with the minute spot exceeding the resolution of light is given onto the recording film using the near-field light. The data reproducing is carried out, using the fact that the surface potential of the recording film varies attendantly on the phase-change, in such a manner that the surface potential of the recording film is detected by the method using the scanning probe microscope.

SUMMARY OF THE INVENTION

However, in the data recording using the near field light as described above, the recording pit, although it exceeds the resolution of light, cannot be actually reduced to the order of magnitude of 10 nm (nanometer).

An object of the present invention is to provide a data recording and reproducing device which can form minute recording pits of the order of magnitude of 10 nm or 1 nm on a phase-change type recoding medium, thereby recording and reproducing data with a high recording density of 1 T (tera) bits/inch$^2$ (=1.5 G (giga) bit/mm$^2$) or higher.

In order to achieve the above object, in accordance with the present invention, there is provided a data recording and reproducing device including: a recording medium of which the surface potential can be varied; a table for holding the recording film; a cantilever having a probe and extending to locate a tip of the probe in the vicinity of the recording film; a Z driving unit that displaces the table or the cantilever in a Z direction vertical to the recording film; an X-Y driving unit that displaces the table or the cantilever in a X-Y direction in parallel to the recording film; a Z control unit that controls the Z driving unit so that the probe is maintained at a position where the probe is in slight contact with the recording film; a write circuit that supplies a recording voltage to the cantilever in response to a recording signal; a surface potential detector that detects the surface potential at a scanning position of the recording film on the basis of a change in the cantilever, wherein a voltage is applied to the recording film through the cantilever and the probe by the write circuit while the probe is moved along the surface of the recording film by the X-Y driving unit and Z driving unit and the Z driving feedback circuit so that the voltage thus applied changes the surface potential at the scanning position of the recording film, thereby recording data, whereas the surface potential at the scanning position of the recording film is detected on the basis of a detected output from the surface potential detector, thereby reproducing the data.

At present, the probe employed in a scanning probe microscope can be reduced to about 15 nm in radius, and further can be reduced to about 5 nm in radius by using a carbon nanotube. Therefore, a recording pit having a size of about 15 nm or 5 nm can be formed on the recording film, thereby realizing the recording density of 1 Tbit/inch$^2$ (pit size of 25 nm) or more. Since the device is designed so that the recording pit is formed by applying a voltage to the recording film through the probe, a phase-change type recording film can be adopted as a recording medium.

Specifically, the phase-change type recoding film which causes a phase change owing to heat can be adopted. In this case, owing to the current supplied to the recording film through the probe, the region at the scanning position of the recording film can be caused to generate heat and bring about the phase-change, thereby writing data, whereas the surface potential which varies attendantly on the phase change is detected, thereby reading the data.

Further, a ferromagnetic material can be employed as the recording film. In this case, the surface potential of the region at the scanning position of the recording film is changed, thereby writing data, whereas the surface potential thus changed is detected, thereby reading the data.

Concretely, the Z control unit may include a vibrator for vibrating the cantilever in a sense including the component in the Z direction; a displacement detector for detecting the displacement due to vibration of the cantilever; a first frequency filter for deriving a specific frequency component from a detected output from the displacement detector; and a Z driving feedback circuit for controlling the Z driving unit according to a magnitude of the specific frequency component.

In this configuration, the distance between the central position of vibration movement of the probe and the recording film can be maintained constant through control by the Z driving feedback circuit.

Further, the surface potential detector includes a voltage output circuit for applying an AC voltage at a prescribed frequency to the cantilever; a second frequency filter for deriving the frequency component at the prescribed frequency or its proximity; a voltage feedback circuit for changing a bias voltage to be applied to the cantilever according to the magnitude of the frequency component derived from the second frequency filter, whereby the voltage feedback circuit controls a potential difference between a central potential of the probe and a surface potential at a scanning position of the recording film so that the potential is maintained constant, and the surface potential at the scanning position of the recording film is detected using the bias voltage.

In this configuration, even when the surface of the recording film with the surface potential changed as a result that the recoding pit has been formed is scanned by the probe, the potential difference between the probe and the surface of the recording film can be maintained constant, thereby reducing the influence of the surface potential of the recording film exerted upon the control of the height of the probe.

BRIEF DESCRIPTION OF THE DRAWINGS

The above objects and advantages of the present invention will become more apparent by describing a preferred embodiment thereof in detail with reference to the accompanying drawings, wherein.

DETAILED DESCRIPTION OF THE PREFERRED EMBODIMENTS

Figure 1:
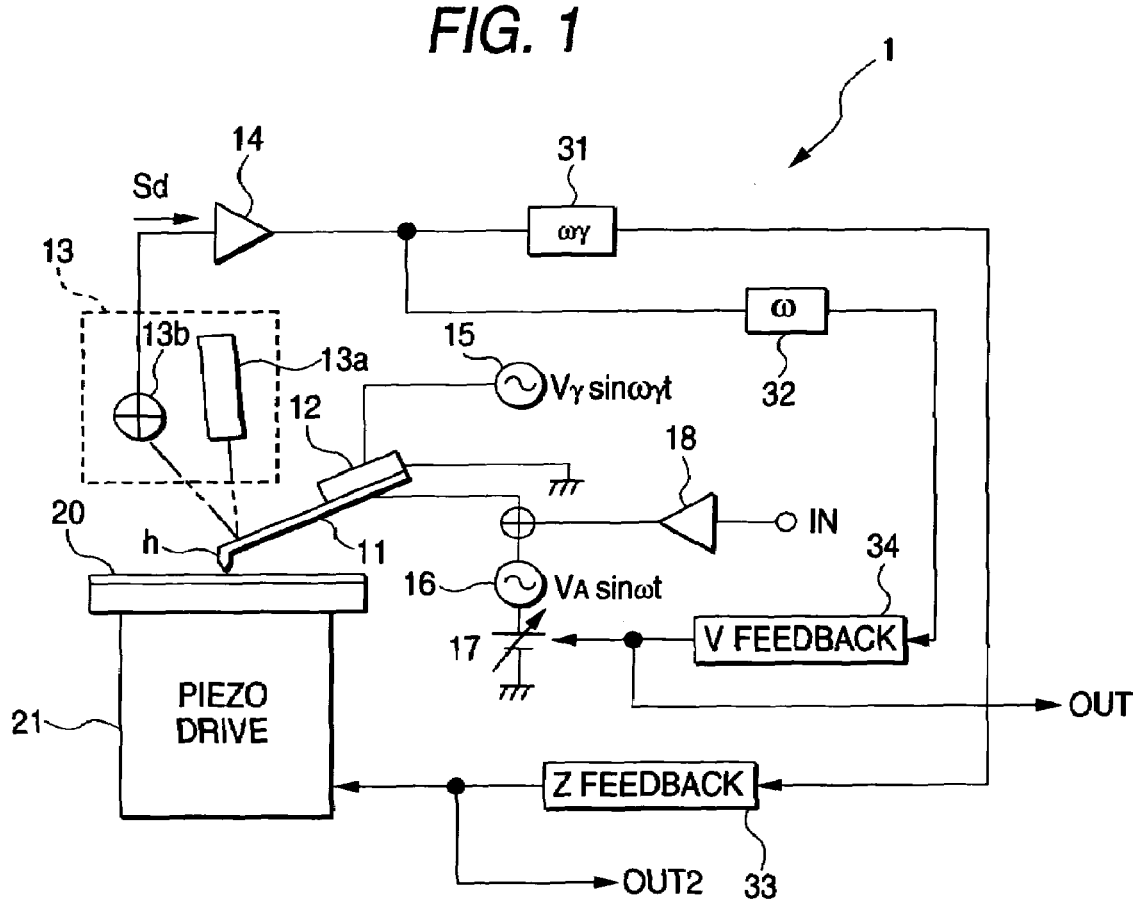
FIG. 1 is an entire configuration diagram of the data recording and reproducing device according to an embodiment of the present invention.

Now referring to the drawings, an explanation will be given of an embodiment of the present invention.

Figure 2:
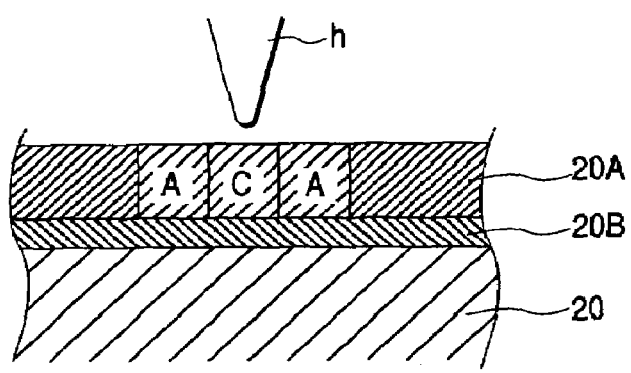
FIG. 2 is a view for explaining the section of a recording film and a probe tip.

FIG. 1 is an entire configuration diagram of the data recording and reproducing device according to an embodiment of the present invention. FIG. 2 is a view for explaining the section of a recording film and a probe tip.

A data recording and reproducing device 1 according to this embodiment includes: a cantilever 11 having a probe h at the tip; a piezo-driving unit 12 which serves as a vibrator for vibrating the cantilever 11 using a piezo-element; an optical lever 13 which serves as a displacement detector for detecting the displacement of the cantilever 11 owing to vibration; a recording medium 20 having a phase-change type recording film; a driving table 21 on which a recording medium 20 is placed and which can make driving in an X-Y direction horizontal to the recording film and minute driving in a Z direction vertical to the recording film; a first voltage circuit 15 for supplying an AC voltage "V$\gamma$ sin $\omega\gamma$t" at the same frequency $\omega\gamma$ as the intrinsic frequency (e.g. 1 MHz) of the cantilever 11 to the piezo-driving 12; a second voltage circuit 16 which serves as a voltage output circuit for applying a voltage "VA sin $\omega$t" at a prescribed frequency w (e.g. 10 MHz) to the cantilever; a variable biasing circuit 17 for supplying a variable bias voltage VB to the cantilever 11; a first frequency filter for deriving a component at the frequency wg from the output of the optical lever 13 through an amplifier 14; a second frequency filter for deriving a component at the frequency w from the output of the optical lever 13 through the amplifier 14; a Z feedback circuit 33 for controlling the driving amount in the Z direction of the driving table 21 according to the output of the first frequency filter 31; a V feedback circuit 34 for controlling the output of the variable bias circuit 17 according to the output of the second frequency filter 32.

In the data recording and reproducing device 1, a recording signal IN externally inputted is supplied to the cantilever 11 through a write amplifier 18 serving as a write circuit. The output of the V feedback circuit 34 is externally outputted as a reproduced signal OUT. The output of the Z feedback circuit 33 is externally outputted as a detected signal OUT2 representative of the surface state of the recording film.

The cantilever 11, which is a flat-spring like lever having the intrinsic frequency $\omega\gamma$, is made of conductor. The probe h is a conductor with the tip having a radius reduced to about 5 nm as seen from FIG. 2.

The recording medium 20 is composed of a lower conductive layer 20B and a phase-change type recording film 20A made of materials such as GeSbTe (germanium/antimony/tellurium), and InAgSbTe (indium/silver/antimony/tellurium). formed on the surface of the lower conductive layer 20B. The recording film 20A has a thickness of about 6 nm. The conductive layer 20B is connected to e.g. ground.

The optical lever 13 serves to detect the displacement of the cantilever 11 with high accuracy in such a manner that the rear surface of the cantilever 11 is irradiated with laser light from a semiconductor laser 13a and the light amount of the reflected light is measured by a photodiode 13b.

An explanation will be given of the operation when the recording and reproducing of data is carried out by the data recording and reproducing device 1 having the configuration described above.

In the data recording and reproducing device 1, the recording or reproducing of data is carried out by driving the driving table 21 in the X-Y direction under the feedback control of the Z feedback circuit 33 so that the probe h moves along the surface of the recording film 20A at a height to realize slight contact with the surface of the recording film 20, i.e. to scan the surface of the recording film 20A.

When the surface of the recording film 20A is scanned by the probe h, the voltage V$\gamma$ sin $\omega\gamma$t is supplied to the piezo-driving unit 12 so that the cantilever 11 makes minute vibration in the sense including the component in the Z direction by driving of the piezo-driving unit 12. The displacement of the cantilever 11 owing to minute vibration is detected by the optical lever 13.

In the case where the probe h is located at the upper position separated from the recording film 20A, the probe h resonates at an intrinsic frequency $\omega\gamma$ by the driving force of the piezo-driving unit 12. At this time, the component at the frequency $\omega\gamma$ of the detected signal Sd produced from the optical lever 13 is maximum. This frequency component is supplied to the Z feedback circuit 33. When the frequency component is maximum, the Z feedback circuit 33 controls the driving table 21 to make minute displacement upward.

On the other hand, when the probe h approaches the recording film 20A so as to be brought into contact therewith, inter-atomic force acts between the probe h and the surface of the recording film 20A. Thus, the probe h generates the vibration at the frequency ($\omega\gamma-\delta\omega$) deviated from the intrinsic frequency. The component of the intrinsic frequency $\omega\gamma$ is correspondingly reduced. This change is supplied to the Z feedback circuit 33. The Z feedback circuit 33 controls the driving table 21 so that the driving table 21 is stopped in the movement in the Z direction when the component of the intrinsic frequency $\omega\gamma$ is smaller by a prescribed value than its maximum value and the driving table 21 is subjected to a downward minute displacement when the reduced amount exceeds the prescribed value.

By the vibration driving of the cantilever 11 by the piezo driving unit 12 and feedback control by the Z feedback circuit 33, the surface of the recording film 20A is scanned by the probe h vibrating vertically in a slight contact with the recording film 20A.

When the recording film 20 is scanned by the probe h, the feedback control of the variable bias circuit 17 and V feedback circuit 34 maintains constant the difference between the central potential of the probe h and the surface potential at the scanning position of the recording film 20A.

Specifically, the AC voltage VA sin ωt at the frequency e.g. ten times higher than the intrinsic frequency ωγ is applied to the cantilever 11 and probe h from the voltage circuit 16. Further, a variable bias voltage VB is also applied to the cantilever 11 and probe h from the variable voltage circuit 17. These voltages (VB+VA sin ωt) exert Coulomb force between the probe h and the surface of the recording film 20A. As a result, the cantilever 11 makes the vibration movement consisting of vibration by the piezo driving unit 12 and the vibration at the ten-times higher frequency ω superposed thereon. The component at the frequency ω of such vibration movement is derived by the second frequency filter 32 and supplied to the V feedback circuit 34.

Now, the Coulomb force acting between the probe h and recording film 20A varies between when the potential difference between the central potential of the probe h and the surface potential at the scanning position of the recording film 20A is a prescribed value (e.g. 0V) and when it is deviated from the prescribed value. Thus, the movement of the cantilever 11 changes. This change in the movement appears as a change in the component at the frequency ω.

The V feedback circuit 34 monitors the component at the frequency ω of the movement of the cantilever 11 and controls the variable bias circuit 17 so that the component is constant at the prescribed value. Thus, the potential difference between the central potential of the probe h and the surface potential at the scanning position of the recording film 20A is maintained at the prescribed value (e.g. 0V).

The frequencies used for above position control in the Z direction and potential control of the probe h, i.e. the frequency ωγ of the vibration by the piezo-driving unit 12 and the frequency ω of the output from the voltage circuit 16 are made greatly different, thereby preventing the interference between these vibrations. Therefore, the position control in the Z direction and potential control of the probe h can be carried out independently.

While the surface of the recording film 20A is scanned by the probe h under the above control, the data recording is carried out by inputting a recording signal IN from the input terminal so as to correspond to the scanning position. For example, when the signal IN at a high level is inputted, a relatively large voltage is instantaneously applied to the cantilever 11 through an amplifier 18 so that a large current is passed to the region of the recording film 20A immediately beneath the tip of the probe h. This current is thereafter passed to the conductive layer 20B. Owing to the current, the region corresponding to the scanning position is heated at 600° C. or higher so that its phase is changed from a crystallized state C into an amorphous state A, thereby forming a recording pit.

Incidentally, the quantity of the current passed through the pertinent region of the recording film 20A can be reduced by output adjustment of the amplifier so that the heat-generating temperature is lowered to 300° C., thereby returning the state of the corresponding region from the amorphous state A to the crystallized state C. This permits the erasure of data and over-write thereof.

The data reproduction is carried out in such a manner as to cause the probe h to scan the surface of the recording film 20A under the position control in the Z direction of the probe h and the potential control thereof. The signal outputted from the V feedback circuit 34 during the scanning is a reproduced signal OUT.

Specifically, the surface potential of the recording film 20A is different between the amorphous state A and the crystallized state C, whereas the potential difference between the central potential of the probe h and the surface potential at the scanning position of the recording film 20A is maintained constant by the above potential control. Namely, when the probe h is located at the region in the amorphous state A, the bias voltage of the probe h is lowered so as to correspond to the surface potential of the region. On the other hand, the probe h is located at the region in the crystallized state C, the bias voltage of the probe h is boosted so as to correspond to the surface potential of the region. Since lowering/boosting the bias voltage of the probe h is performed by the control output from the V feedback circuit 34, the reproduced signal OUT identical to this control output indicates whether the scanning position of the probe h is in the amorphous state A or the crystallized state C.

Incidentally, using a detected signal OUT2 when the output from the Z feedback circuit 33 is externally outputted, the uneven state of the surface of the recording film 20A can be observed.

As understood from the description hitherto made, in accordance with the data recording and reproducing device 1, since the recording pit is formed using the probe h of which the tip can be thinned to 15 nm or 5 nm, data can be recorded and reproduced at a high recording density of 1 Tbit/inch$^2$. Further, by passing the current from the probe h to the recording film 20A so that the corresponding region is heated, the recording film 20A which is a phase-change type recoding medium of which the phase is shifted owing to heat can be employed as a recording medium. Since the research and development is the phase-change type recording medium is now particularly progressing, a recording film having a property suited to high recording density with high accuracy can be obtained relatively easily.

The present invention should not be limited to the embodiment described above, but realized in various modifications. For example, in the above embodiment, in order to detect the displacement by the vibration of the cantilever, the optical lever was used. However, other various detecting means can be used. Further, the recording film may be not only a heat-phase-change type material but may be ferromagnetic material.

The configuration for the position control in the Z direction of the probe and the potential control thereof should not be limited to that of only the Z feedback circuit 33 and V feedback circuit 34 in the above embodiment. Such a configuration may be used as a basic configuration so as to be combined with various correction circuits capable of improving accuracy and response performance.

As understood from the description hitherto made, in accordance with the present invention, since a recording pit is formed on a recording film using a probe with a tip which can be thinned to about 15 nm or 5 nm, data recording and reproducing can be carried out with a high recording density of 1 Tbit/inch$^2$.

In accordance with the present invention, since the recoding pit can be formed through application of a voltage to the recording film from the probe, a phase-change type recording film can be employed as a recording medium. Therefore, a recording film having a property suited to high recording density with high accuracy can be obtained relatively easily.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A data recording and reproducing device comprising:
a table for holding a recording medium having a phase-change type recording film;
a cantilever having a probe and extending to locate a tip of the probe in the vicinity of the recording film;
a Z driving unit that displaces the table or the cantilever in a Z direction vertical to the recording film;
an X-Y driving unit that displaces the table or the cantilever in a X-Y direction in parallel to the recording film;
a vibrator that vibrates the cantilever in a sense including the component in the Z direction;
a displacement detector that detects the displacement due to vibration of the cantilever;
a first frequency filter that derives a specific frequency component from a detected output from the displacement detector;
a Z driving feedback circuit that controls the Z driving unit so that a distance between the central position of vibration movement of the probe and the recording film is maintained constant at a position where the probe is in slight contact with the recording film according to a magnitude of the specific frequency component;
a write circuit that supplies a recording voltage to the cantilever in response to a recording signal;
a voltage output circuit applies an AC voltage at a prescribed frequency to the cantilever;
a second frequency filter that derives the frequency component at the prescribed frequency or its proximity;
a voltage feedback circuit that changes a bias voltage to be applied to the cantilever so that a potential difference between a central potential of the probe and a surface potential at a scanning position of the recording film is maintained constant according to a magnitude of the frequency component derived from the second frequency filter,
wherein a current is supplied to the recording film through the cantilever and the probe by the write circuit while the probe is moved along the surface of the recording film by the X-Y driving unit and Z driving unit and the Z driving feedback circuit so that the heat generated by the current causes a phase change in the region at a scanning position of the recording film, thereby recording data, whereas the surface potential at the scanning position of the recording film is detected on the basis of the magnitude of the bias voltage which is changed by the voltage feedback circuit, thereby reproducing the data.

2. A data recording and reproducing device comprising:
a recording medium having a recording film having a variable surface potential;
a table for holding the recording medium;
a cantilever having a probe and extending to locate a tip of the probe proximate the recording film;
a Z driving unit configured to displace one of the table and the cantilever in a Z direction perpendicular to the recording film;
an X-Y driving unit configured to displace one of the table and the cantilever in a X-Y direction in parallel to the recording film;
a Z control unit configured to control the Z driving unit so that the probe is maintained at a position where the probe is in slight contact with the recording film;
a write circuit configured to supply a recording voltage to the cantilever in response to a recording signal;
a surface potential detector configured to detect the surface potential at a scanning position of the recording film on the basis of a displacement of the cantilever,
wherein the displacement of the cantilever is based on a first frequency for controlling a position of the probe in the Z direction and on a second frequency for controlling a potential of the probe,
wherein the first frequency is different from the second frequency by a predetermined value to control the position of the probe in the Z direction and the potential of the probe independently,
wherein a voltage is applied to the recording film through the cantilever and the probe by the write circuit while the probe is moved along the surface of the recording film by the X-Y driving unit and Z driving unit and the Z driving feedback circuit so that the applied voltage changes the surface potential at the scanning position of the recording film in order to record data, and
wherein the surface potential at the scanning position of the recording film is detected on the basis of a detected output from the surface potential detector in order to reproduce the data.

3. The data recording and reproducing device according to claim 2, wherein the recording film is a phase-change type film which causes a phase change owing to heat, and
wherein a current is supplied through the probe to the region at the scanning position of the recording film to generate heat to cause the phase change in order to record data, and
wherein the surface potential which changes attendantly on the phase change is detected by the surface potential detector in order to reproduce the data.

4. The data recording and reproducing device according to claim 2, wherein the Z control unit includes:
a vibrator configured to vibrate the cantilever in at least the Z direction;
a displacement detector configured to detect displacement due to vibration of the cantilever;
a first frequency filter configured to derive a specific frequency component from a detected output from the displacement detector; and
a Z driving feedback circuit configured to control the Z driving unit according to a magnitude of the specific frequency component.

5. A data recording and reproducing device comprising:
a recording medium having a recording film of which the surface potential configured to be varied;
a table for holding the recording medium;
a cantilever having a probe and extending to locate a tip of the probe in the vicinity of the recording film;
a Z driving unit configured to displace one of the table and the cantilever in a Z direction vertical to the recording film;
an X-Y driving unit configured to displace one of the table and the cantilever in a X-Y direction in parallel to the recording film;
a Z control unit configured to control the Z driving unit so that the probe is maintained at a position where the probe is in slight contact with the recording film, wherein the Z control unit including:
a vibrator configured to vibrate the cantilever in directions including the Z direction;
a displacement detector configured to detect the displacement due to vibration of the cantilever;
a first frequency filter configured to derive a specific frequency component from a detected output from the displacement detector; and a Z driving feedback circuit configured to control the Z driving unit according to a magnitude of the specific frequency component;

a write circuit configured to supply a recording voltage to the cantilever in response to a recording signal;

a surface potential detector configured to detect the surface potential at a scanning position of the recording film on the basis of a displacement of the cantilever, and wherein a voltage is applied to the recording film through the cantilever and the probe by the write circuit while the probe is moved along the surface of the recording film by the X-Y driving unit and Z driving unit and the Z driving feedback circuit so that the applied voltage changes the surface potential at the scanning position of the recording film to record data, wherein the surface potential at the scanning position of the recording film is detected on the basis of a detected output from the surface potential detector to reproduce the data, and wherein the surface potential detector includes:

a voltage output circuit configured to apply an AC voltage at a prescribed frequency to the cantilever;

a second frequency filter configured to derive the frequency component at the prescribed frequency or its proximity;

a voltage feedback circuit configured to change a bias voltage to be applied to the cantilever according to the magnitude of the frequency component derived from the second frequency filter, whereby the voltage feedback circuit controls a potential difference between a central potential of the probe and a surface potential at a scanning position of the recording film so that the potential is maintained constant, and the surface potential at the scanning position of the recording film is detected using the bias voltage.

* * * * *